W. A. CHAPMAN.
SOUND REPRODUCER AND RECORDER.
APPLICATION FILED AUG. 11, 1908.
998,465.
Patented July 18, 1911.
3 SHEETS—SHEET 1.
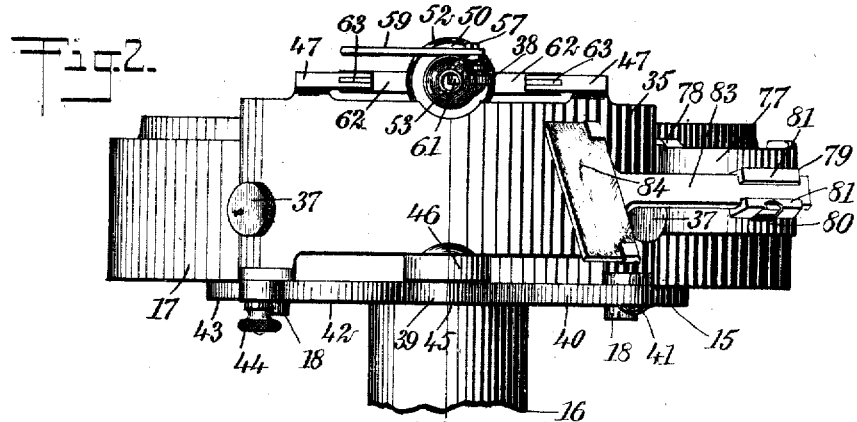
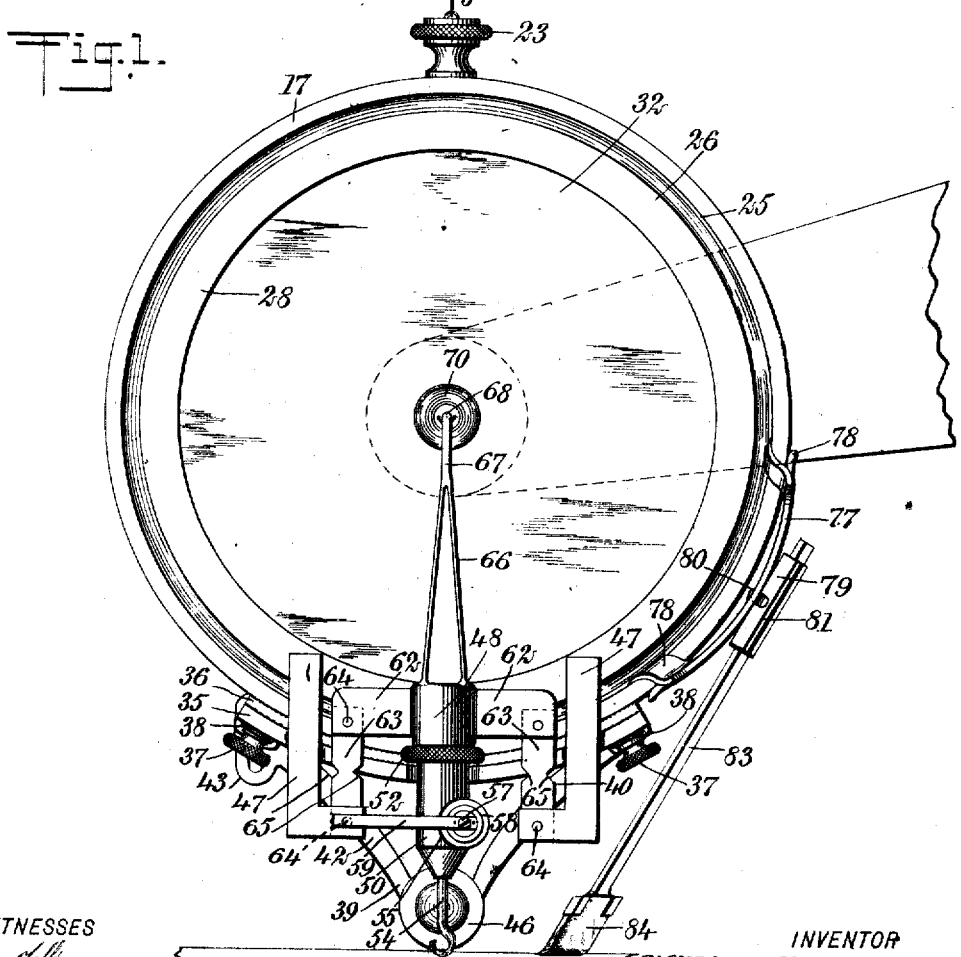
WITNESSES
INVENTOR
William A. Chapman
BY
ATTORNEYS

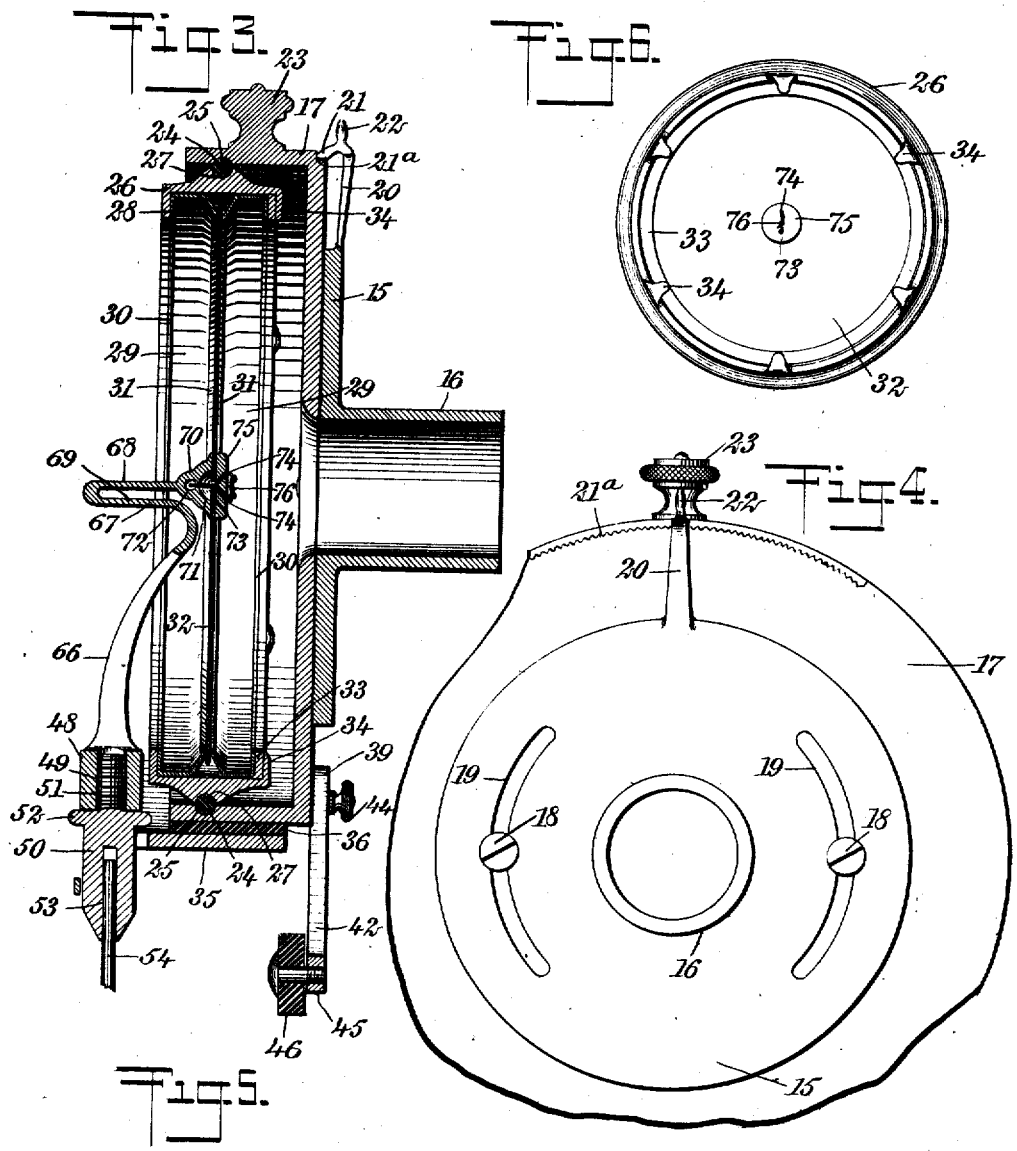

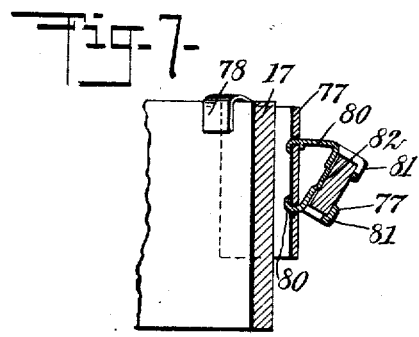
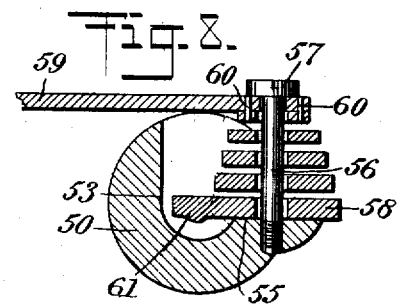
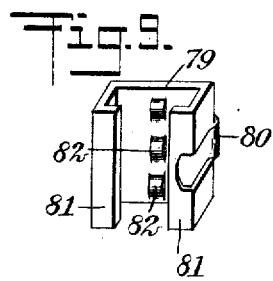
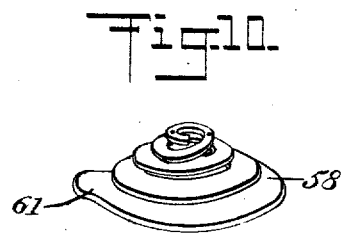
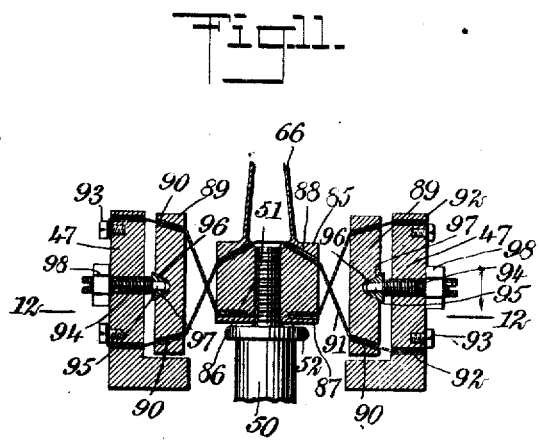
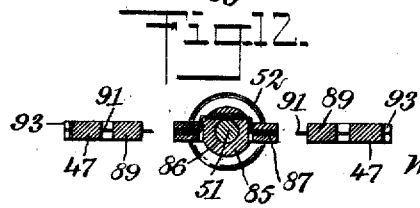

UNITED STATES PATENT OFFICE.

WILLIAM ALBERT CHAPMAN, OF SMITHVILLE, ARKANSAS.

SOUND REPRODUCER AND RECORDER.

998,465.

Specification of Letters Patent. Patented July 18, 1911.

Application filed August 11, 1908. Serial No. 447,944.

*To all whom it may concern:*

Be it known that I, WILLIAM ALBERT CHAPMAN, a citizen of the United States, and a resident of Smithville, in the county of Lawrence and State of Arkansas, have invented a new and Improved Sound Reproducer and Recorder, of which the following is a full, clear, and exact description.

This invention relates to sound recorders and reproducers, and is particularly useful in connection with talking machines employing disk or other types of records upon which the sound waves are recorded in the form of grooves, and in which diaphragms are used to reproduce the sounds from the grooves, or to form the grooves upon blank records.

An object of the invention is to provide a simple, inexpensive and durable sound recorder and reproducer, which is adapted for the dual purpose of forming the sound recording grooves in the record, and for reproducing the sounds from grooves already impressed or formed upon the records, and which requires no structural or other change to fit it for either purpose, beyond replacing a recording needle or point by a reproducing needle or point or vice versa as the case may be.

A further object of the invention is to provide a device of the class described by means of which sounds can be reproduced with great clearness and power, and by means of which metallic, scratching or other undesirable sounds due to the contact of the record with the reproducing point are to a large extent eliminated.

A still further object of the invention is to provide a device of the class described in which the weight of the reproducer is supported not upon the recording or reproducing point or needle, but is carried by a special roller provided therefor and engaging the record for this purpose, in which the diaphragm is of special form and is free not only to vibrate but to move bodily, and in which the stylus bar is extensible and is carried by the sound box casing in such a manner that there is no metallic contact between the parts.

Another object of the invention is to provide a sound reproducer in which the stylus bar is of peculiar form to transmit the undulations of the sound grooves most efficiently to the diaphragm, and there convert them into diaphragm vibrations or movements which cause the propagation of the sound waves, in which special means are provided for holding the recording or reproducing needles in place, and for adjusting them accurately so that the length of the stylus bar remains unchanged, and in which the stylus bar itself is flexibly suspended from a cradle secured to the sound box casing, though rigidly held against upward, lateral and torsional movements.

The invention consists in the construction and combination of parts to be more fully described hereinafter and particularly set forth in the claims.

Reference is to be had to the accompanying drawings, forming a part of this specification, in which similar characters of reference indicate corresponding parts in all the views, and in which—

Figure 1 is a front elevation of one embodiment of my sound recorder and reproducer; Fig. 2 is an inverted plan view of the device; Fig. 3 is a longitudinal section on the line 3—3 of Fig. 1; Fig. 4 is a partial rear elevation of the sound box; Fig. 5 is a rear elevation of the lower portion of the device; Fig. 6 is a rear or inside elevation of the diaphragm and the means for securing it in place; Fig. 7 is an enlarged transverse section showing a bracket for securing a record cleaning brush or scraper to the sound box; Fig. 8 is an enlarged transverse section showing the needle grip; Fig. 9 is a perspective view showing a detail of the scraper-holding bracket; Fig. 10 is a perspective view showing a detail of the needle point grip; Fig. 11 is an enlarged transverse section showing the means of modified form for securing the stylus bar to the sound box; and Fig. 12 is a longitudinal section on the line 12—12 of Fig. 11.

Before proceeding to a more detailed explanation of my invention, it should be clearly understood, that while the same is particularly useful in connection with talking machines employing disk records, it can also be advantageously used with other and varied forms of talking machines. In changing the device from a recorder to a reproducer it is necessary, merely, to remove the recording point and to insert in place of it a reproducing point or needle. The recording point is essentially a cutting tool, for forming the undulating sound grooves in the wax of the master record, whereas the reproducer is a blunt or otherwise suitably fashioned needle or point which merely follows the form of the grooves in the record and transmits its consequent vibrations to the diaphragm, which reproduces the sounds.

The degree of perfection attainable in the reproduction of sound waves as these are perpetuated upon a record depends to a large extent, upon the uniformity in width, pitch and smoothness of cut of the grooves formed in the wax coating of the master plate or record by the sound-impelled recording tool or graver. I find, furthermore, that the movement of the stylus bar in a talking machine, if the bar is mounted upon pivotal points or ball or knife-edged bearings and is held thereon resiliently, speedily effects a new centering of the contacting points, owing to the wearing of these points on their seats and the weakening of the springs, together with the lateral and upward pressure due to the weight of the sound box carried by the point in engagement with the record. The supporting of the weight upon the reproducing point, moreover, is productive of irregular and ungoverned movements of the cutting tool when the device is used as a recorder, while in the reproducer it results in the production of chattering, scraping, and metallic sounds. In other forms of talking machines in which the stylus bar is secured to the casing through the movement of a plate spring placed horizontally and transversely with respect to the plane of the diaphragm, I find that the lateral pressure induces a torsional strain in the spring, materially reducing its resiliency and tending to enlarge the opening in the diaphragm at which the stylus bar is secured, whereby the diaphragm is weakened and its attachment to the stylus bar is eventually loosened. In these various forms of mounting the stylus bar in place, the circular or arc movements of the ends of the stylus bar are intensified and result in an unequal bearing of the diaphragm upon its seat; consequently, where the connection between the stylus bar and the diaphragm is rigid, as when they are secured together by means of a screw and a plate, the arc or circular movements effect a shifting of the diaphragm on its seat, and unless such movement is provided for, a binding or buckling of the diaphragm results, with the development of lines of flection across its face.

Mica has long been considered among the most satisfactory of materials for talking machine diaphragms, but I find that with use, such diaphragms develop certain lines of weakness that very materially modify the sounds reproduced. Furthermore, diaphragms as they are ordinarily mounted are tuned or keyed to certain predetermined ranges of notes within the limits of which the reproduction is good, but that when such limits are exceeded there is an absence of color tones, which renders the reproduction more or less harsh and unpleasant to the ear. In my device I provide a diaphragm which is attuned to a wide range of tones, by being so mounted that it is sensitive not only to vibrations of the usual kind, but to impulses which will produce bodily movements of the diaphragm in its entirety. The stylus bar which I have invented, is so formed that it transmits the impulses to the diaphragm at right angles to the plane of the same. The diaphragm is cushioned and its bodily movements are thus resiliently resisted. It is furthermore, insensitive to foreign and undesirable impulses transmitted, for example, through the sound box casing and consisting for instance, in the scraping sounds due to the contact of the needle point with the record.

I provide means for securing the needles or reproducing points to the stylus bar at a uniform length, so that the leverage is always the same. Furthermore, the stylus bar of my invention is extensible and thus permits the adjustment of the leverage when such adjustment is necessary or desirable.

I mount the stylus bar of my invention in such a manner that it is self-adjusting, cushioned, and highly responsive to slight impulses. There is no metallic contact between the stylus bar and the sound box casing or between the cradle which supports the stylus bar, and the casing. It would seem that to secure constant and uniform motion in the stylus bar and to effect elimination of the metallic sounds, all loose, movable contact of the parts must be avoided. Again, the scratching, scraping sound of the needle in its passage over the sound grooves, while it cannot be eliminated, must be separated from the sounds to be reproduced, and must be prevented from entering the sound tube, if the sound issuing therefrom is to be improved.

It is of great importance that the movement of the cutting tool when recording, and of the reproducing point, be hampered or hindered in no way whatsoever, and therefore, I have found it of advantage to support the weight of the sound box upon a roller which engages the record, and which thus relieves the recording or reproducing point of this unnecessary weight. The roller is adjustable so that the sound box can be raised or lowered as necessary, with respect to the record.

I have found that the volume of sound can be modified without the use of a special needle, by simply shifting the sound box about its center, thereby changing the angle of the bearing of the needle on the face of the record, and further, such shifting or change in angle of bearing of the needle is an important feature in the proper operation of the sound reproducer.

Referring more particularly to the drawings, I provide a preferably circular plate 15 which has a substantially central orifice, a cylindrical extension 16 encompassing the orifice and serving to attach the plate to a sound tube or other conduit for transmitting the sounds reproduced from the record. The cylindrical sound box casing 17 is arranged adjacent to the plate 15 at the side thereof remote from the extension 16, and is secured thereto by means of adjustable screws or studs 18 which extend through oppositely positioned slots 19 in the plate 15. The slots 19 constitute arcs of a circle having its center at the center of the plate, and thus permit the sound box to be rotated with respect to the plate. The latter has an arm or upward extension 20 provided with a nose 21 adapted to engage a series of teeth or indentations 21ª at the upper rim of the sound box to hold the same in position relative to the plate. The arm 20 has a stud 22 by means of which it can be conveniently manually operated. The sound box has a preferably ornamental knob or button 23 by means of which it can be grasped and adjusted. The sound box is open at the front, and near the open edge has an annular interior groove 24 in which is seated an annular cushion 25 preferably of circular cross section and fashioned from resilient material such as rubber or the like. A diaphragm ring 26 having an annular groove 27, encompassing the same, is arranged within the sound box and engages the cushion 25 at its groove 27. In this way the diaphragm ring is resiliently and movably mounted within the sound box. At the front, the diaphragm ring has an inwardly disposed annular flange 28 against which seats a retaining ring 29 having an inwardly disposed flange 30 at right angles thereto, and a second inwardly disposed flange 31 which is inclined at an angle with respect to the flange 30. A second, similar ring 29 is arranged opposite to the first ring with its flange 31 adjacent to the corresponding flange of the first ring. A diaphragm 32 is located between the retaining rings 29 and is clamped in place intermediate the flanges 31 of the retaining ring. An annular locking member 33 is located against the flange 30 of the inner retaining ring 29 and holds both these rings in place. The diaphragm ring at the inner edge has inwardly extending fingers 34 which engage the locking member 33 and hold the same in position. The retaining rings may be of rubber or other resilient material.

Arranged at the under side of the sound box casing is a cradle plate 35, curved to conform to the curvature of the wall of the sound box, and having interposed between it and the sound box a suitably formed resilient sheet 36, consisting preferably of soft rubber or other cushion material. The cradle plate is secured in place by means of thumb-nuts or screws 37, having rubber or other cushion washers or buffers 38 separating them from the plate, the latter being provided with suitable openings for the passage therethrough of the thumb-nuts which enter suitably threaded openings of the sound box. A substantially V-shaped yoke 39, is positioned at the rear edge of the cradle plate 35, and has one arm 40 secured to the edge of the cradle plate by means of a pivot pin 41. The other arm 42, at the end has a slotted extension 43 which receives to the edge of the cradle plate by means of which the yoke can be secured in any one of a plurality of positions. Near the center, the yoke has a bearing 45 in which is journaled a roller 46 adapted to engage the record A to support the weight of the sound box. At the front edge, the cradle plate 35 has separated, substantially vertical arms 47, rigidly secured thereto or integral therewith. The arms have the lower ends inwardly disposed and slotted for a purpose which will appear hereinafter. The stylus bar is arranged between the arms 47 and includes an upper substantially cylindrical part 48 provided with a threaded opening 49 therethrough. The lower, substantially cylindrical portion 50 of the stylus bar, has a threaded stud 51 adapted to be adjustably received by the opening 49. The lower portion 50 of the stylus bar has a milled or burred flange or rim 52 by means of which it can be easily adjusted. It has further, at the lower end an opening or recess 53 to receive the recording or reproducing point or needle 54. At one side the portion 50 of the stylus bar is cut away to form a flat face 55 which is laterally extended. A pin 56 is pivoted upon the face 55 and has a slotted head 57 by means of which it can be adjusted. A flat, substantially helical, resilient member 58 is arranged upon the pin 56 and has rigid therewith an arm 59 secured in place by means of rivets 60 or in any other convenient manner. The member 58 has the end or part 61 free, so that in a predetermined position of the member 58 it projects over the opening 53 of the stylus bar to clamp or bind the needle or point in position within the opening 53. The arrangement is such that when the arm 59 is downwardly disposed a needle or point can be inserted freely in the opening 53. The arm 59 serves as a means for determining the distance to which the needle or point shall be inserted into the opening of the stylus bar, and it is thus possible to regulate the effective length of the stylus bar so that the latter remains uniform. By swinging the arm 59 upwardly the member 58 is turned to bring the part 61 over the opening 53 to clamp the point in place.

The stylus bar portion 48 has opposite, laterally extending wings 62 either rigidly secured thereto or integral therewith. At the ends, the wings are slotted and receive the extremities of strips 63 of resilient material such as spring metal or the like. The lower ends of the strips are secured in the slotted inwardly disposed ends of the arms 47. Rivets 64 or the like serve to hold the extremities of the strips in place. In this way the stylus bar is mounted upon the sound box so that it is free to swing in predetermined directions, while it is firmly held against upward, lateral, or torsional movements. The points of flexure of the strips can be determined by providing notches 65 in the sides thereof, which may be located where necessary or desirable. It will be understood that the stylus bar is freely movable in a plane at substantially right angles to the plane of the diaphragm, while it is held against movements in other planes.

The stylus bar portion 48 has an upwardly extending rigid stylus arm 66, preferably bifurcated and curving inwardly toward the center of the diaphragm 32. Near its upper end the sides of the stylus arm join to form a part 67 extending outwardly to a point remote from the diaphragm a distance greater than any other part of the arm. A further part 68 is disposed inwardly toward the diaphragm and is substantially parallel to the part 67, forming with the same, a narrow slot 69. The parts 67 and 68 are at normally right angles with respect to the diaphragm, the part 67 being more attenuated than 68, so that it can bend freely. The part 68 terminates in a substantially bell-shaped enlargement 70, having a flat face provided with a recess 71 and having, further, an opening 72 connected with the recess 71. The diaphragm 32 has a substantially central opening 73, through which passes a double, flexible member 74 consisting of an annealed copper wire or other suitable line. The flexible member extends through the recess 71 into the opening 72, and through further openings, to the outside of the enlargement 70, about which it is looped. A plate 75 is arranged at the side of the diaphragm remote from the stylus arm and has two converging openings 76 therethrough, each of which receives one run of the flexible member 74 and which terminate together at the opening 73 of the diaphragm. The runs of the member are twisted together at the outer side of the plate 75, to secure the latter, the diaphragm and the stylus arm, firmly though resiliently and flexibly together.

A bracket 77 fashioned from resilient metal or the like and having the ends 78 bifurcated, is mounted upon the rim of the sound box by means of the ends, which bind or grip the edge of the sound box. Intermediate its ends, the bracket carries a clip 79. The clip has the sides provided with inwardly extending flanges 81, and at the bottom has a series of projections or ribs 82. The sides have portions cut away to form fingers 80, which are rearwardly disposed and curved to engage in suitable openings provided therefor in the bracket 77. One of the fingers 80 is longer than the other, whereby the clip can be mounted at an angle with respect to the bracket. A shank 83 is arranged slidably and adjustably within the clip and is held frictionally in place. At the lower end it is bifurcated and has arranged between the bifurcated parts a brush or scraper 84 fashioned from soft rubber or other material suited to the purpose. The scraper engages the record as the latter is rotated, in advance of the needle point, and thus cleans the record and removes dust or other foreign bodies which would tend to interfere with perfect contact between the needle point and the sound grooves. The shank is arranged at an acute angle, so that the engagement of the scraper with the record is at a similar angle to the line of rotation. The scraper also steadies the record while it is moving.

I prefer to form the diaphragm from a plate of mica, and a plate of like size and form, of a metallic foil cemented, under pressure, to the mica. If desired, a sheet of paper or similar material can be cemented intermediate the sheet of mica and the foil. I have found that a diaphragm of this construction, that is, of combined plates of mica and metal foil, or of mica, metal foil and paper, possesses superior resiliency and tonal qualities, and admits in its construction, of the utilization of a grade of material which has hitherto not been found suitable for this purpose.

In Figs. 11 and 12 is shown a means of modified form for mounting the stylus bar in position upon the sound box. In this form of the device I provide a block 85 having a threaded opening 86 therethrough adapted to receive the stud 51 of the lower stylus bar portion 50. The stylus arm 66 is rigid with the block 85. The latter has openings 87 and 88 therethrough at the upper and lower portions respectively. The openings 87 and 88 extend through the block from side to side, encompassing the central opening 86. At each side of the block are arranged tension plates 89 having inclined openings 90 therethrough. Lines or cords 91 are arranged in the openings 87, 88 and 90 and are crossed intermediate the block and the tension plates 89. The arms 47 have openings 92 through which the cords 91 pass. The latter are secured at the outer sides of the arms 47 by means of set screws 93. Adjusting screws 94 are arranged in suitable openings of the arms 47, and have constricted ends 95 upon which are arranged tapered rubber jackets 96 engaging in correspondingly formed recesses 97 of the tension plates. In lieu of such jacketed screws I may cushion the recesses 97. The adjusting screws have the ends slotted and are provided with adjusting nuts 98 at the outside of the arms. By means of the adjusting screws the plates 89 can be moved away from the arms to spread the cords or lines to regulate the tension of the same. It will be understood that in this way the stylus bar is held so that it is free to move in a plane substantially at right angles to the plane of the diaphragm, but is firmly held against upward, lateral and torsional movements. The openings 90 of the tension plates are inclined toward the blocks 85, while the upper openings 88 of the latter are downwardly inclined.

The fact that the stylus bar comprises relatively movable parts 48 and 50 and can be lengthened or shortened by the adjustment of these parts permits the sound box to be used for the purpose of reproducing from and producing of sound records. When used for reproducing sounds it is desirable to have the greater length of the stylus bar between the fulcrum and the center of the diaphragm, to magnify the movements of the needle point when they are transmitted to the diaphragm. On the other hand, when the device is being used for making a record it is desirable to have the movements of the recording point relatively larger, and the stylus bar is then lengthened for this purpose, by screwing the part 50 in the proper direction. The latter part is free to move in the direction of its length as it has no connection with the sound box other than that through the part 48.

Having thus described my invention, I claim as new, and desire to secure by Letters Patent:

1. In a device of the class described, a sound-box, a ring therein, a diaphragm within said ring, and an annular member encircling said ring and serving to suspend and retain said ring movably within and out of contact with said sound-box, said member being fashioned from resilient material.

2. In a device of the class described, a sound box, a diaphragm ring within said sound box, a solid annular resilient member between said sound box and said ring and forming a cushion mount for said ring, retaining rings within said diaphragm ring, a diaphragm between said retaining rings, and means for holding said retaining rings clamped together to secure said diaphragm in place.

3. In a device of the class described, a substantially cylindrical sound box having an internal annular recess, a diaphragm ring within said sound box, and having an annular recess, an annular member of resilient material engaging said recesses to mount said ring within said sound box and to permit a limited cushioned movement of said ring, and a diaphragm mounted to vibrate within said ring.

4. In a device of the class described, a sound box, a diaphragm ring within said sound box and having a cushioned engagement therewith whereby said ring has a limited bodily movement, said ring having an inwardly extending flange, a retaining ring within said diaphragm ring and resting against said flange, a second retaining ring within said diaphragm ring, said retaining rings having inclined flanges at the adjacent edges, a diaphragm arranged between said inclined flanges of said retaining rings, and a locking ring engaging one of said retaining rings to secure said retaining rings in position, said diaphragm ring having projections engaging said locking ring to secure the same in place.

5. In a device of the class described, a substantially cylindrical sound box having an internal annular recess, a diaphragm ring within said sound box and having an annular recess, an annular member of resilient material engaging said recesses to mount said ring within said sound box and to permit a limited cushioned movement of said ring, said ring having an inwardly extending flange, a retaining ring within said diaphragm ring and resting against said flange, a second retaining ring within said diaphragm ring, said retaining rings having inclined flanges at the adjacent edges, a diaphragm arranged between said inclined flanges of said retaining rings, and a locking ring engaging one of said retaining rings to secure said retaining rings in position, said diaphragm ring having projections engaging said locking ring to secure the same in place.

6. In a device of the class described, a plate having a substantially central opening, a sound box rotatable with respect to said plate and having an opening registering with said opening of said plate, a diaphragm within said sound box, a stylus bar carried by said sound box and controlling said diaphragm, said stylus bar being adapted to receive a recording or a reproducing needle, and a spring arm on said plate and engaging said box to hold the same in a plurality of positions with respect to said plate.

7. In a device of the class described, a plate having a substantially central opening, means for effecting communication between said opening and a sound tube, a cylindrical sound box adjacent to said plate, said plate at each side of its central opening having curved slots, studs projecting through said slots and rigid with said sound box, said sound box having an opening adapted to register with said opening of said plate, said plate having an extension adapted to engage said sound box whereby the latter can be held in a plurality of positions, a diaphragm within said sound box, and a stylus bar controlling said diaphragm.

8. In a device of the class described, a sound box, a diaphragm therein, a cradle plate cushioned upon said sound box, arms rigid with said cradle plate, a stylus bar controlling said diaphragm, and flexible strips parallel to the plane of said diaphragm and connecting said stylus bar and said arms.

9. In a device of the class described, a sound box, a diaphragm therein, a cradle plate cushioned upon said sound box, arms rigid with said cradle plate and having inwardly disposed portions provided with slots, a stylus bar having laterally extending wings provided with slots, and flexible strips having the ends secured in said slots respectively, of said wings and said arms.

10. In a device of the class described, a sound box, a diaphragm therein, a cradle secured to said sound box, a stylus bar controlling said diaphragm, and separate flexible strips connecting said stylus bar and said cradle, said strips having sharply defined edge recesses medially located.

11. In a device of the class described, a sound box, a diaphragm therein, a stylus bar movably carried by said sound box and controlling said diaphragm, a yoke pivoted upon said sound box and adjustable with respect thereto, a roller carried by said yoke and adapted to engage a record to support said sound box, and means for adjusting said yoke.

12. In a device of the class described, a diaphragm, and a stylus bar in-curved toward said diaphragm and having at the end adjacent to said diaphragm a part extending outwardly therefrom, and a further part extending inwardly toward said diaphragm, said parts being substantially parallel and forming a narrow slot therebetween at substantially right angles to said diaphragm, said parts in length exceeding the width of said slot.

13. In a device of the class described, a sound box, a diaphragm therein, and a stylus bar mounted upon said sound box and having an arm incurved toward said diaphragm, said arm at the end adjacent to said diaphragm being outwardly and inwardly disposed whereby an outward extension is formed having a narrow slot therein, said outward extension extending to a point remote from said diaphragm a distance greater than any other part of said stylus bar, and exceeding in length the width of said slot.

14. In a device of the class described, a stylus bar, a flexible member engaging said stylus bar, a diaphragm having an opening, said flexible member extending through said opening to the side of said diaphragm remote from said stylus bar, and means for securing said flexible member at the side of said diaphragm remote from said stylus bar.

15. In a device of the class described, a diaphragm, a stylus bar having at the end adjacent to said diaphragm an extension, said diaphragm having an opening therethrough, a flexible member engaging said extension and passing through said opening of said diaphragm, and a plate at the side of said diaphragm remote from said stylus bar and having openings therethrough, said flexible member passing through said openings of said plate and being twisted to secure said plate, said diaphragm and said stylus bar together.

16. In a device of the class described, a stylus bar having an opening to receive a needle, and a face adjacent said opening, a helical member rotatably mounted upon said face and having a part adapted to project over said opening when said member is in a predetermined position, and an arm controlling said member.

17. In a device of the class described, a stylus bar having an opening adapted to receive a needle, means for clamping the needle in said opening, and an arm controlling said clamping means, said arm, when said clamping means are inoperative, being arranged in a position such that it constitutes a gage for determining the insertion of the needle into the opening of said stylus bar.

18. In a device of the class described, a stylus bar having an opening adapted to receive a needle and provided with a flat face adjacent said opening, a pin rotatably mounted upon said face, a helical member loosely mounted upon said pin and having a part adapted to project over said opening to clamp the needle in place, and an arm controlling said member, said arm constituting a gage to determine the depth of insertion of the needle into said opening.

19. In a device of the class described, a diaphragm comprising a sheet of mica, a sheet of metal foil, and a sheet of paper interposed therebetween, said sheets being cemented together under pressure.

20. In a device of the class described, a sound box, a diaphragm ring therein, a solid annular cushion between said ring and said box, annular resilient members in said ring, said members having opposite flanges angularly positioned with respect to each other, and a diaphragm held between said flanges.

21. In a device of the class described, a sound box, a diaphragm ring therein, an annular member encompassing said ring and consisting of a solid, resilient material whereby said ring has a cushioned engagement with said box, annular resilient members in said ring, said members having opposite flanges angularly positioned with respect to each other and extending toward each other, and a diaphragm held between said flanges.

22. In a device of the class described, a rotatable sound box, means on said box whereby the same can be manually adjusted to positions for reproducing and recording, a diaphragm within the sound box, and a stylus bar controlling said diaphragm, said stylus bar being rotatively extensible below the fulcrum point thereof.

23. In a device of the class described, a sound box, a diaphragm therein, a stylus bar controlling said diaphragm and movably mounted on said box, said stylus bar having self contained means for providing a greater leverage below than that above the fulcrum.

24. In a device of the class described, a sound box, a diaphragm therein, a stylus bar controlling said diaphragm, said stylus bar comprising a female section movably mounted on said box and fulcrumed thereon, said female section being inextensibly secured to said diaphragm, a male section in rotative engagement with said female section and operative therein to lengthen said stylus bar, said male section having means for holding a reproducing or recording needle.

In testimony whereof I have signed my name to this specification in the presence of two subscribing witnesses.

WILLIAM ALBERT CHAPMAN.

Witnesses:
J. E. MOORE,
L. H. KAISER.